3,152,112
PHENYLAZO- AND PHENYLHYDRAZO-
PYRIMIDINES
Alan Hodgson Laird, Justus Kenneth Landquist, and
Bernard William Langley, Macclesfield, England, assignors to Imperial Chemical Industries Limited, London,
England, a corporation of Great Britain
No Drawing. Filed June 14, 1960, Ser. No. 35,900
Claims priority, application Great Britain July 3, 1959
6 Claims. (Cl. 260—154)

This invention relates to heterocyclic compounds and more particularly it relates to phenylazo- and phenylhydrazo-pyrimidines which possess useful therapeutic properties, for example as antibacterial agents.

According to the invention we provide phenylazo- and phenylhydrazopyrimidines of the formula:

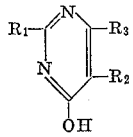

wherein $R_1$ stands for the hydroxy or amino radical, wherein $R_2$ stands for hydrogen or an alkyl radical, and wherein $R_3$ stands for a substituted phenylazo- or phenylhydrazo-radical of the formula:

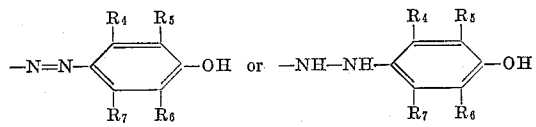

wherein $R_4$, $R_5$, $R_6$ and $R_7$, which may be the same or different, stand for hydrogen or alkyl or alkenyl radicals or halogen atoms, and the salts thereof.

It is to be understood that said phenylazo radical of the formula:

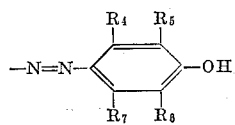

may be represented by the tautomeric formula:

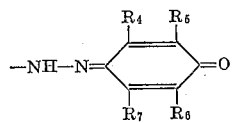

wherein $R_4$, $R_5$, $R_6$ and $R_7$ have the meanings stated above.

As a suitable value for $R_2$ there may be mentioned, for example, an alkyl radical containing not more than five carbon atoms, for example the methyl radical.

As suitable values for $R_4$, $R_5$, $R_6$ and $R_7$ there may be mentioned, for example, alkyl radicals containing not more than five carbon atoms, for example the methyl or n-propyl radical, or alkenyl radicals containing not more than five carbon atoms, for example the allyl radicals, or halogen atoms, for example, the chlorine or bromine atom.

As suitable salts there may be mentioned, for example, acid-addition salts, for example salts with inorganic acids, for example hydrochloric acid, and metal salts, for example salts with alkali metals, for example sodium or potassium salts, or with alkaline earth metal salts, for example calcium or barium salts.

As preferred phenylazo- and phenylhydrazopyrimidines of the present invention there may be mentioned 2,6-dihydroxq - 4-(4-hydroxyphenylazo)pyrimidine, 2-amino-6-hydroxy - 4-(4-hydroxyphenylazo)pyrimidine, $N^1$-(2,6-dihydroxypyrimid-4-yl)-$N^2$ - hydroxyphenyl)hydrazine and $N^1$-(2-amino-6-hydroxypyrimid-4-yl)-$N^2$-(4-hydroxyphenyl)hydrazine.

According to a further feature of the invention we provide a process for the manufacture of the said phenylazopyrimidines which comprises the interaction of a hydrazinopyrimidine of the formula:

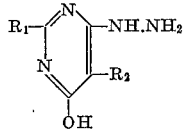

wherein $R_1$ and $R_2$ have the meanings stated above, with a benzoquinone of the formula:

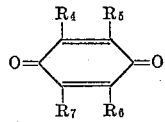

wherein $R_4$, $R_5$, $R_6$ and $R_7$ have the meanings stated above.

The reaction may conveniently be carried out by mixing or heating the reactants together in the presence of an inert diluent or solvent, for example water, alcohol, tetrahydrofuran or dimethylformamide, and in the presence of an acidic catalyst, for example an organic acid, for example acetic or formic acid, or an inorganic acid, for example sulphuric or hydrochloric acid, or in the presence of boron trifluoride. The reaction may also be carried out in the presence of a substance which is a diluent or solvent and also acidic, for example acetic or formic acid.

According to a further feature of the invention we provide a process for the manufacture of the said phenylhydrazopyrimidines which comprises the reduction of a phenylazopyrimidine of the formula:

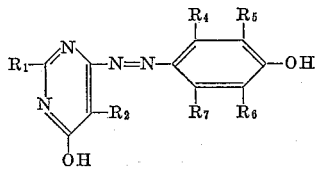

wherein $R_1$, $R_2$, $R_4$, $R_5$, $R_6$ and $R_7$ have the meanings stated above.

The said reduction may conveniently be effected by use of reducing agents which are known to the art to be suitable for the conversion of an azo-compound to a hydrazo-compound. Thus the said reduction may be effected, for example, by use of sodium dithionite, or by catalytic hydrogenation, for example by reaction with hydrogen in the presence of platinic oxide.

The phenylazo- and phenylhydrazopyrimidines of the invention possess antibacterial properties both in vitro and in vivo, and in particular they are effective against Staphylococci which have developed resistance to certain antibiotics.

According to a further feature of the invention we provide pharmaceutical and veterinary compositions which comprise at least one of the said phenylazo- or phenylhydrazopyrimidines, or a salt thereof, in admixture with a non-toxic pharmaceutically-acceptable diluent or carrier.

The said compositions may be for oral or parenteral administration or for topical application. Thus, for example, the said compositions may be in the form of tablets, aqueous or oily solutions, aqueous or oily suspensions, sterile aqueous or oily solutions, sterile aqueous or oily suspensions, ointments or creams. The said compositions may be obtained using conventional pharmaceutical excipients by procedures well known in the art.

Certain of the said compositions are particularly useful in the treatment of mastitis in cattle. These preferred compositions are creams which are applied by intramammary injection. Suitable pharmaceutical excipients for the provision of said creams are well known in the art, and as suitable excipients there may be mentioned, for example, mixtures of polyethylene glycols. The dosage of said cream administered by intramammary injection is conveniently adjusted so that each dose contains between 100 mg. and 750 mg. of said phenylazo- or phenylhydrazo-pyrimidine derivative.

The invention is illustrated but not limited by the following examples in which the parts are by weight:

*Example 1*

A mixture of 1 part of 1,4-benzoquinone, 1 part of 4-hydrazino-2,6-dihydroxypyrimidine and 20 parts of 98% formic acid is stirred at 25° C. for five minutes, at 50° C. for a further five minutes, and is then cooled. The mixture is filtered and the solid residue is washed with formic acid, water, and ethanol, and is then dried. There is thus obtained 2,6-dihydroxy-4-(4-hydroxyphenylazo)pyrimidine, which decomposes gradually above 250° C.

4-hydrazino-2,6-dihydroxypyrimidine, used as starting material in the above procedure, may be obtained as follows:

A solution of 1 part of 4-chloro-2,6-dihydroxypyrimidine in a mixture of 1 part of 100% hydrazine hydrate and 10 parts of water is heated under reflux for one hour and is then cooled and filtered. The solid residue is 4-hydrazino-2,6-dihydroxypyrimidine, which decomposes at 290° C.

*Example 2*

A solution of 3.7 parts of 1,4-benzoquinone in 20 parts of ethanol is added to a stirred suspension of 4.3 parts of 4-hydrazino-2,6-dihydroxypyrimidine in 100 parts of 1-N hydrochloric acid. The mixture is stirred for 30 minutes at 20° C. and filtered, and the solid residue is washed with water and ethanol and is then dried. There is thus obtained 2,6-dihydroxy-4-(4-hydroxyphenylazo)pyrimidine, which decomposes gradually above 250° C.

*Example 3*

1.4 parts of sodium dithionite are added to a solution of 1 part of 2,6-dihydroxy-4-(4-hydroxyphenylazo)pyrimidine and 0.4 part of sodium hydroxide in 10 parts of water. The mixture is kept at 0° C. in an atmosphere of nitrogen for 1 hour, and then 1.5 parts of acetic acid are added to it. The mixture is filtered and the solid residue is washed with water and dried. There is thus obtained $N^1$ - (2,6 - dihydroxypyrimid - 4 - yl) - $N^2$ - (4-hydroxyphenyl)hydrazine, which darkens above 200° C.

*Example 4*

A solution of 0.6 part of 1,4-benzoquinone in 8 parts of warm ethanol is added to a stirred suspension of 0.8 part of 4-hydrazino-2,6-dihydroxy-5-methylpyrimidine in 20 parts of 1-N hydrochloric acid. The mixture is stirred for 1 hour at 20° C., and then filtered and the solid residue is washed with ethanol and water and dried. There is thus obtained 2,6-dihydroxy-4-(4-hydroxyphenylazo)-5-methylpyrimidine which decomposes above 255° C.

4-hydrazino-2,6-dihydroxy-5-methylpyrimidine, which is used as starting material in the above procedure, may be obtained as follows:

A solution of 1 part of 4-chloro-2,6-dihydroxy-5-methylpyrimidine in 50 parts of water containing 1 part of 100% hydrazine hydrate is heated under reflux during 18 hours in an atmosphere of nitrogen. The mixture is cooled and filtered and the crystalline residue is recrystallized from water. 4-hydrazino-2,6-dihydroxy-5-methylpyrimidine is obtained as colourless needles which melt with decomposition at 275–276° C.

The 4-chloro-2,6-dihydroxy-5-methylpyrimidine used as starting material may be obtained as follows:

A mixture of 1 part of 4-chloro-2,6-dimethoxy-5-methylpyrimidine, 1 part of aqueous 36% hydrochloric acid, 10 parts of water and 40 parts of acetic acid is heated under reflux for 2½ hours and evaporated to dryness in vacuo. Crystallization of the residue from water gives 4-chloro-2,6-dihydroxy-5-methylpyrimidine, M.P. 266–267° C.

*Example 5*

A mixture of 1 part of 4-hydrazino-2,6-dihydroxypyrimidine, 0.84 part of 2,5-toluquinone, 145 parts of acetic acid and 145 parts of water is heated under reflux for 5 minutes and then cooled. The mixture is filtered and the solid residue is recrystallized from ethanol. There is thus obtained 2,6-dihydroxy-4-(4-hydroxy-3-methylphenylazo)pyrimidine, which decomposes above 250° C.

*Example 6*

A mixture of 1.1 parts of 4-hydrazino-2,6-dihydroxypyrimidine, 1.6 parts of 2-chloro-1,4-benzoquinone and 40 parts of 98% formic acid is stirred at 20° C. for 15 minutes. The mixture is filtered and the solid residue is recrystallized from acetic acid. There is thus obtained 2,6 - dihydroxy - 4 - (3 - chloro - 4 - hydroxyphenylazo)pyrimidine, which decomposes above 270° C.

*Example 7*

A mixture of 1 part of 4-hydrazino-2,6-dihydroxypyrimidine, 1 part of 2-allyl-1,4-benzoquinone and 50 parts of 1-N hydrochloric acid is ground together for 20 minutes at 20° C. The mixture is filtered and the solid residue is crystallized from 50% aqueous acetic acid. There is thus obtained 2,6-dihydroxy-4-(3-allyl-4-hydroxyphenylazo)pyrimidine, which decomposes at 230° C.

*Example 8*

A mixture of 1 part of 4-hydrazino-2,6-dihydroxypyrimidine, 1 part of 2-n-propyl-1,4-benzoquinone and 30 parts of 98% formic acid is stirred at 20° C. for 20 minutes. An equal volume of water is then added to the mixture. The mixture is filtered and the solid residue is washed with water and then with ethanol and then dried. There is thus obtained 2,6-dihydroxy-4-(4-hydroxy - 3-n - propylphenylazo)pyrimidine, which decomposes at 238–242° C.

*Example 9*

A solution of 7.2 parts of 1,4-benzoquinone in 80 parts of ethanol is added to a stirred mixture of 10 parts of 2-amino-4-hydrazino-6-hydroxypyrimidine and 1000 parts of 3-N hydrochloric acid. The mixture is stirred for 15 minutes at 20° C., filtered and the solid residue is washed with water and ground with a solution of 10 parts of sodium acetate in 100 parts of water. The mixture is filtered and the solid residue is washed with water and dried. There is thus obtained 2-amino-6-hydroxy-4-(4-hydroxyphenylazo)pyrimidine, which decomposes above 250° C.

The 2-amino-4-hydrazino-6-hydroxypyrimidine used as starting material may be obtained as follows: A mixture of 1 part of 2-amino-4-chloro-6-hydroxypyrimidine, 1 part of 100% hydrazine hydrate and 50 parts of water is heated under reflux for 1 hour and is then cooled. The mixture is filtered and the solid residue is washed with water and dried. There is thus obtained 2-amino-4-hydrazino-6-hydroxypyrimidine, which decomposes above 300° C.

*Example 10*

A mixture of 1.6 parts of 2-chloro-1,4-benzoquinone, 1.1 parts of 2-amino-4-hydrazino-6-hydroxypyrimidine, 10 parts of ethanol and 30 parts of 1-N hydrochloric acid is stirred at 20° C. for 20 minutes. The mixture is filtered and the solid residue is washed with water and dried. There is thus obtained 2-amino-6-hydroxy-4-(3-chloro - 4 - hydroxyphenylazo)pyrimidine hemihydrochloride, which decomposes above 250° C.

*Example 11*

1.4 parts of sodium dithionite are added to a solution of 1 part of 2-amino-6-hydroxy-4-(4-hydroxyphenylazo) pyrimidine and 0.4 part of sodium hydroxide in 10 parts of water. The mixture is shaken at room temperature in an atmosphere of nitrogen during 10 minutes, and then 1.5 parts of acetic acid are added to it. The mixture is filtered and the solid residue is washed with water. The solid residue is stirred with 5 parts of 4% hydrochloric acid during 5 minutes and the mixture is then filtered. The solid residue is washed with water and dried. There is thus obtained $N^1$-(2-amino-6-hydroxypyrimid-4-yl)-$N^2$-(4-hydroxyphenyl)hydrazine hydrochloride, which decomposes at 210–220° C.

*Example 12*

32 parts of 2,6-dihydroxy-4-(4-hydroxyphenylazo)pyrimidine and 68 parts of polyethylene glycol 300 are milled together during 24 hours. A mixture of 10 parts of polyethylene glycol 1500 and 90 parts of polyethylene glycol 400 is heated to 50° C. and stirred, and then gradually cooled to ambient temperature while stirring is continued. The mixture containing the pyrimidine derivative and that consisting of the two polyethylene glycols are mixed. There is thus obtained a cream suitable for intramammary injection for the treatment of mastitis.

What we claim is:
1. A compound which in the free base form has the formula:

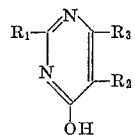

wherein $R_1$ is selected from the group consisting of hydroxy and amino; $R_2$ is selected from the group consisting of hydrogen and alkyl containing up to five carbon atoms; and $R_3$ is a radical selected from the group consisting of:

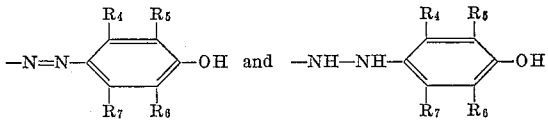

wherein $R_4$, $R_5$, $R_6$ and $R_7$ are selected from the group consisting of hydrogen, alkyl and alkenyl containing up to five carbon atoms chlorine and bromine.

2. The pharmaceutically acceptable hydrochloride salts of the compounds of claim 1.
3. The compound 2,6-dihydroxy-4-(4-hydroxyphenylazo)pyrimidine.
4. The compound 2-amino-6-hydroxy - 4 - (4-hydroxyphenylazo)pyrimidine.
5. The compound $N^1$-(2,6-dihydroxypyrimid-4-yl)-$N^2$-(4-hydroxyphenyl)hydrazine.
6. The compound $N^1$ - (2 - amino-6-hydroxypyrimid-4-yl)-$N^2$-(4-hydroxyphenyl) hydrazine.

References Cited in the file of this patent
UNITED STATES PATENTS

| | | |
|---|---|---|
| 2,628,229 | Boon et al. | Feb. 10, 1953 |
| 2,649,397 | Ballard | Aug. 18, 1953 |
| 2,675,375 | Marson et al. | Apr. 13, 1954 |
| 2,872,449 | Baumann et al. | Feb. 3, 1959 |
| 2,940,895 | Overbeek | June 14, 1960 |
| 2,980,665 | Langley et al. | Apr. 18, 1961 |
| 2,980,678 | Langley et al. | Apr. 18, 1961 |